US010648781B1

(12) United States Patent
Behiel

(10) Patent No.: US 10,648,781 B1
(45) Date of Patent: May 12, 2020

(54) SYSTEMS AND METHODS FOR AUTOMATICALLY SCORING SHOOTING SPORTS

(71) Applicant: Arthur J. Behiel, Pleasanton, CA (US)

(72) Inventor: Arthur J. Behiel, Pleasanton, CA (US)

( * ) Notice: Subject to any disclaimer, the term of this patent is extended or adjusted under 35 U.S.C. 154(b) by 117 days.

(21) Appl. No.: 15/881,797

(22) Filed: Jan. 28, 2018

Related U.S. Application Data

(60) Provisional application No. 62/454,033, filed on Feb. 2, 2017.

(51) Int. Cl.
*A63F 9/24* (2006.01)
*F41J 5/10* (2006.01)
*G06T 7/73* (2017.01)
*F41J 5/14* (2006.01)
*A63B 71/06* (2006.01)

(52) U.S. Cl.
CPC ............ *F41J 5/10* (2013.01); *A63B 71/0619* (2013.01); *F41J 5/14* (2013.01); *G06T 7/74* (2017.01); *A63B 2071/0663* (2013.01); *G06T 2207/30221* (2013.01)

(58) Field of Classification Search
CPC ........ G06T 2207/30221; A63B 71/0619; F41J 5/10; F41J 5/14
See application file for complete search history.

(56) References Cited

U.S. PATENT DOCUMENTS

| 4,222,564 A | 9/1980 | Allen et al. | |
| 4,804,325 A * | 2/1989 | Willits | F41G 3/2661 434/19 |
| 4,923,402 A * | 5/1990 | Marshall | F41G 3/2627 235/462.49 |
| 5,991,043 A * | 11/1999 | Andersson | F41G 3/2611 356/400 |
| 6,643,968 B2 | 11/2003 | Glock | |
| 7,271,954 B2 | 9/2007 | Perger et al. | |
| 7,832,137 B2 | 11/2010 | Sammut et al. | |
| 8,100,694 B2 | 1/2012 | Portoghese et al. | |
| 2003/0195046 A1* | 10/2003 | Bartsch | F41A 33/02 463/49 |

(Continued)

OTHER PUBLICATIONS

American Technologies Network Corp., "X-Spotter HD Day&Night Smart HD Spotting Scope, Operator's Manual," 2016, 30 pages.

(Continued)

*Primary Examiner* — Steve Rowland
(74) *Attorney, Agent, or Firm* — Silicon Edge Law Group LLP

(57) ABSTRACT

A system for scoring shooting sports includes an adapter that attaches an optical device to a mobile computer programmed to support scoring, analysis, and coaching. The mobile computer includes an image detector to sample images of a target, the images including pre-launch image data sampled before a projectile is launched at the target and post-launch image data sampled after the projectile is launched at the target. The system includes an accelerometer to detect projectile launches and thus distinguish pre-launch and post-launch image data. The mobile computer compares the pre-launch image data and the post-launch image data to locate a point of impact of the projectile on the target. A user interface on the mobile computer indicates the point of impact to the shooter.

19 Claims, 7 Drawing Sheets

(56) References Cited

U.S. PATENT DOCUMENTS

| | | | |
|---|---|---|---|
| 2004/0083637 A1 | 5/2004 | Sands | |
| 2005/0021282 A1* | 1/2005 | Sammut | F41G 1/38 702/150 |
| 2006/0005447 A1* | 1/2006 | Lenner | F41G 3/06 42/111 |
| 2008/0233543 A1 | 9/2008 | Guissin | |
| 2011/0003269 A1* | 1/2011 | Portoghese | F41A 33/02 434/18 |
| 2012/0178053 A1* | 7/2012 | D'Souza | F41A 33/02 434/22 |
| 2012/0258432 A1* | 10/2012 | Weissler | F41J 5/10 434/20 |
| 2014/0278220 A1* | 9/2014 | Yuen | G01B 21/16 702/150 |
| 2014/0367918 A1 | 12/2014 | Mason | |
| 2015/0042873 A1 | 2/2015 | Hunt | |
| 2015/0323286 A1* | 11/2015 | Theriault | F41G 3/00 42/111 |
| 2016/0138891 A1* | 5/2016 | Hancosky | F41G 1/35 42/114 |
| 2016/0209173 A1* | 7/2016 | Dribben | F41J 5/06 |

OTHER PUBLICATIONS

Waterman and Salazar, "Electronic Target, Senior Design II," Northern Illinois University under advisor Dr. Abul Azad, Dec. 8, 2011, 38 pages.

American Technologies Network Corp., "ThOR-HD Series Thermal Smart HD Riflescope Manual," 2016, 32 pages.

Allen, Southwick et al. "Target Shooting in America," National Shooting Sports Foundation, 2013, 16 pages.

Splatterburst Targets (TM), website downloaded Jan. 30, 2017 from http://splatterbursttargets.com/, 3 pages.

Wales, Merkel et al., "Shooting sport," downloaded Jan. 31, 2017 from https://en.wikipedia.org/wiki/Shooting_sport, 8 pages.

Shooter's Technology LLC, "Orion Scoring System," product description downloaded Feb. 9, 2017 from http://www.orionscoringsystem.com, 2 pages.

Miles V, "iTarget, train at home with your phone," http://www.thefirearmblog.com/blog/2016/04/22/itarget-train-home-phone/, posted Apr. 22, 2016, 8 pages.

Jacek Rudzinski and Marcin Luckner, "Low-cost Computer Vision Based Automatic Scoring of Shooting Targets," Warsaw University of Technology, Faculty of Mathematics and Information Science, Sep. 2012, 12 pages.

BGWhite, Flinch, et al., "Electronic Scoring System," https://en.wikipedia.org/wiki/Electronic_scoring_system, downloaded Jan. 31, 2017, 4 pages.

Ya-Bei Yang, Zun Li, and Yao Zhoa, "Automatic Scoring System," Huazhong University of Science & Technology, Nios II Embedded Processor Design Contest—Outstanding Designs 2006, 69 pages.

Sius AG, "Sius Let's tell you about our company",product literature re: electronic scoring systems, SIUS AG, Im Langhag 1, CH-8307 Effretikon, Switzerland, downloaded Feb. 9, 2017, 12 pages.

Jacek Rudzinski and Marcin Luckner, "Automatic Scoring of Shooting Targets with Tournament Precision," Warsaw University of Technology, Faculty of Mathematics and Information Science, Jan. 2012, 12 pages.

Akhil Singh, "Implementing Rectangle Detection using Windowed Hough Transform," Music Engineering, University of Miami, 2015, 10 pages.

* cited by examiner

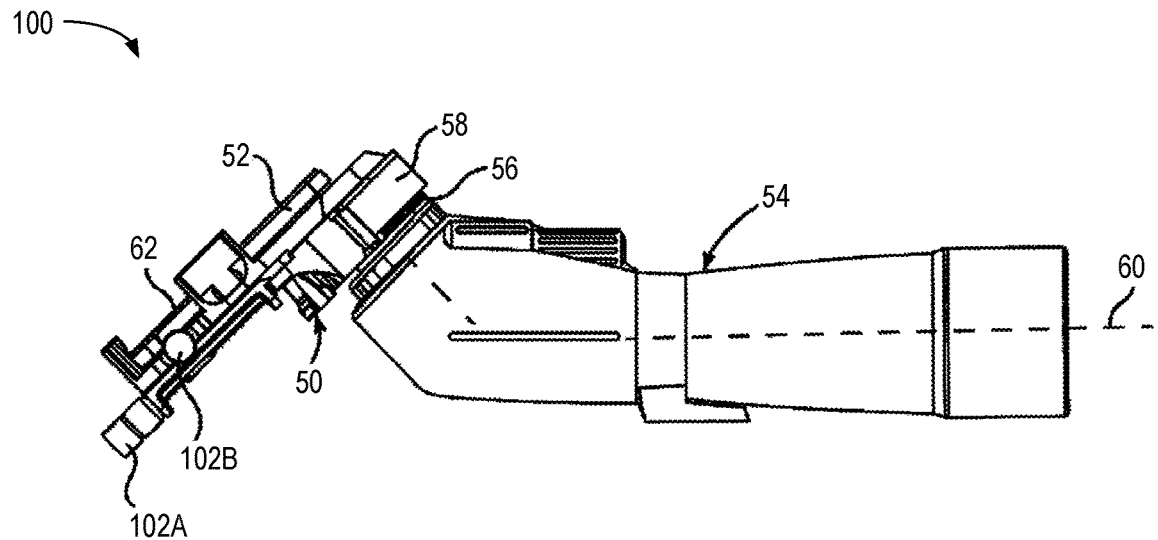
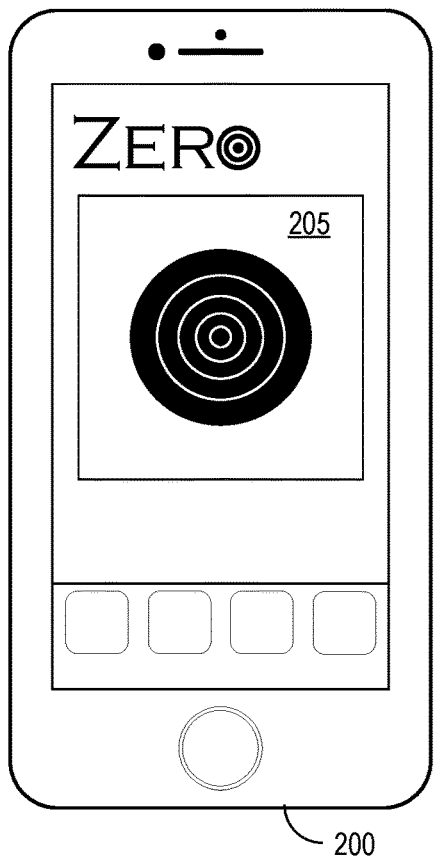
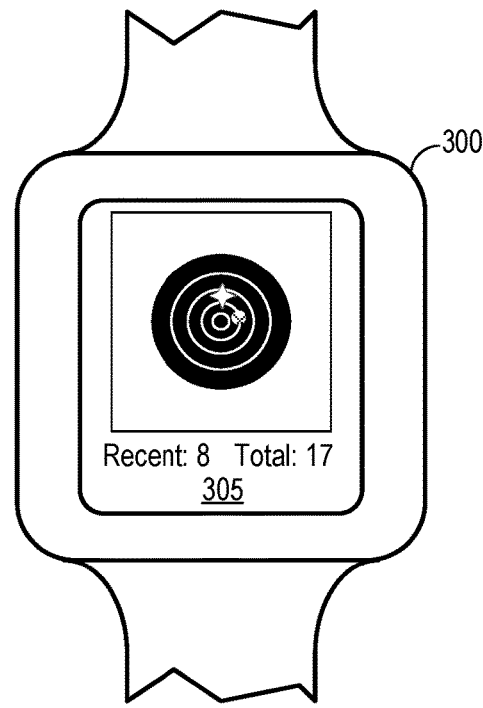
FIG. 1
FIG. 2
FIG. 3

1100

Insights:
1. Coaching
2. Equipment
3. Ammo  1105

Personal Records:
1. Rifle distances
2. Pistol distances
3. Bow distances  1110

Leaderboard:  1115
1. You
2. Friend 1
3. Friend 2

- Tabs for overall, pistol, rifle, range, distance, etc.
- Normalize shooters (e.g., extract effects of weapons and ammo.)

Equipment:
1. AR15
   a. Manufacturer Ballistics
   b. Your Ballistics
   c. Accessories
2. Glock 17
   a. Manufacturer Ballistics
   b. Your Ballistics
   c. Accessories  1120

Ammo:
1. <u>223 Rem 55 gr HP American Gunner®</u>
   a. Manufacturer Ballistics
   b. Your Ballistics
2. <u>9mm Luger 100 gr FTX® Critical Defense® Lite</u>
   a. Manufacturer Ballistics
   b. Your Ballistics  1125

Shooting Sessions:
1. Livermore
2. Castro Valley
3. Shasta
OR
by date  1130

Badges:
1. 100 Meter Expert
2. Pistol Marksman  1135

Targets: (can have check box to limit selection to history, available weapons, or shooting styles)
1. <u>Print</u>
2. <u>Order Online</u>  1140

SYSTEMS AND METHODS FOR AUTOMATICALLY SCORING SHOOTING SPORTS

BACKGROUND

Participants engage in shooting sports to hone hunting and defensive skills, or for the simple enjoyments of companionship, skill acquisition, and mastery. Perhaps more than other sports, equipment and environmental variables play a relatively large role in shooting performance. Myriad weapons and weapon types fire projectiles too numerous to mention at different targets over different ranges. The inestimable combinations make it difficult to isolate shooter proficiency from other variables. The emphasis on factors other than skill can slow improvement. A shooter may be unable to distinguish a bad day from the effects of new ammunition, for example. Skill deemphasis also discourages friendly competition between differently equipped rivals. Shooting sports address this issue by dividing contests into different gun divisions to level the playing field. However, sspecialization limits competition between groups and leads to increased expenditures on custom weapons and ammunition that may be out of reach for the average shooter. Moreover, a hunter or police officer may wish the compete with the tool he or she uses rather than a system optimized for stationary, paper targets at a fixed range. There are therefore demands for systems and methods that isolate equipment and environmental variables from shooting sports, and that foster skill acquisition and competition among shooters.

BRIEF DESCRIPTION OF THE DRAWINGS

FIG. 1 is a view of a system 100 for scoring shooting sports.

FIG. 2 depicts an Internet-enabled multimedia device 200 programmed to support the scoring and analysis of shooting sports in accordance with one embodiment.

FIG. 3 depicts a wearable computer 300 (a "smart watch") programmed to provide a user interface that reports scoring, coaching, and shot-placement data to shooters, and to convey launch-detection signals to computer device 200 via e.g. a wireless connection.

FIG. 11 depicts data fields of a webpage 1100 that a shooter maintains in accordance with one embodiment.

DETAILED DESCRIPTION

Figure 4:
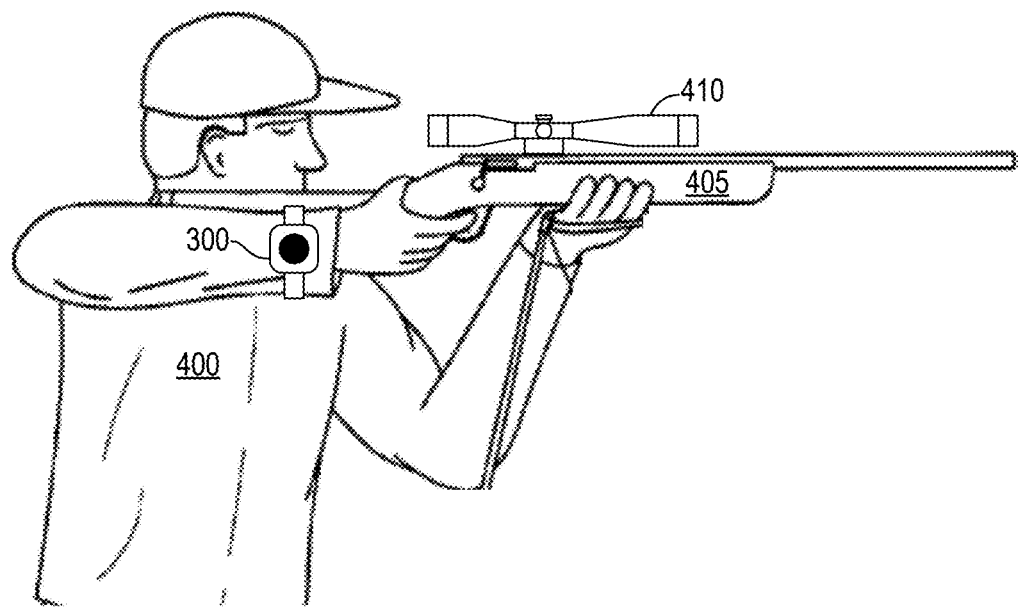
FIG. 4 depicts a shooter 400 holding a weapon 405 with a scope 410 aimed at a target (not shown).

FIG. 1 is a perspective view of a system 100 for scoring shooting sports. An adapter 50 attaches a mobile device 52 to an optical device 54 in accordance with one embodiment. Mobile device 52 is programmed to support the scoring, analysis, and coaching of shooting sports. As used herein, "mobile device" refers to a smartphone, cell phone, or other portable telecommunications enabled device. In the illustrated embodiment, the optical device 54 is a spotting scope, but could be a variety of other devices.

Shooting sports involve the launching of various types of projectiles, including bullets, pellets, arrows, missiles, and bolts, toward a target that in some way records the point of impact as a measure of proficiency. Competitors in shooting sports have various labels. For example, a marksman may use a rifle to fire bullets, an archer a bow to loose arrows, and a dart player her hand to throw darts. For purposes of this disclosure the person engaging in a shooting sport is a "shooter" and the launching device, if any, a "weapon."

An exemplary optical device 54 is disclosed in U.S. Pat. No. 7,271,954 to Perger, which is hereby incorporated by reference. Adapter 50 is releasably attached to eyepiece 56 on the optical device 54 by flexible adjustable device 58, such as for example, a strap. The flexible adjustment device 58 permits the adapter 50 to be attached to eyepieces 56 of various sizes. The large surface area of engagement between the strap 58 and the eyepiece 56 reduces the risk of rotation of the adapter 50 relative to the eyepiece 56. The strap 58 preferably wraps at least 180 degrees, and more preferably at least 220 degrees, of the outer surface of the eyepiece 56. In one embodiment, the strap 58 includes a high friction coating, such as rubber or silicone, to increase fixation. Adapter 50 and its use are detailed in U.S. Patent Application 2015/0042873, which is incorporated herein by reference.

FIG. 2 depicts an Internet-enabled multimedia device 200, such as an iPhone® available from Apple, Inc. of Cupertino, Calif., programmed to support the scoring and analysis of shooting sports in accordance with one embodiment. As discussed more fully below, device 200 can additionally include e.g. GPS support, a microphone, a speaker, a magnetometer, a barometer, a thermometer, an accelerometer, a processor, memory, and wireless transceivers to communicate via e.g. Bluetooth®, WiFi and cellular connections. Returning to FIG. 1, optical device 54 is a spotting scope with 45× magnification and mobile device 52 an iPhone® 6 with an eight megapixel camera. Device 200 is programmed to image a target 205 of one or more users engaged in a shooting sport, and to populate image 205 with depictions of points of impact.

FIG. 3 depicts a wearable computer 300 (a "smart watch"), such as an Apple Watch available from Apple, Inc. Computer 300 includes a user interface with a screen 305. Though not shown, computer 300 can additionally include e.g. a microphone, a speaker, a pulse sensor, a magnetometer, a barometer, a thermometer, an accelerometer, processors, memory, and wireless transceivers to communicate wirelessly via e.g. Bluetooth™ and Wifi connections. Wearable computer 300 is programmed to provide a user interface that reports scoring, coaching, and shot-placement data to shooters, and to convey launch-detection signals to computer device 200 via e.g. a wireless connection.

FIG. 4 depicts a shooter 400 holding a weapon 405 with a scope 410 aimed at a target (not shown). An instance of wearable computer 300 of FIG. 3 is strapped to the wrist of shooter 400. Mechanically coupled to weapon 405 via the shooter's hand, wearable computer 300 can employ readings from an internal accelerometer to detect movement of weapon 405 that accompanies the launch of a projectile (the recoil, or "kick"). The raw or processed accelerometer reading, or the fact of its detection, can be transmitted wirelessly to multimedia device 200 to prompt image acquisition and target analysis. In one embodiment, for example, wearable computer 300 senses recoil using its accelerometer and a weapon report using its microphone. An accelerometer or image analysis can detect camera movement due to e.g. weapon recoil and allow the camera to settle before image acquisition.

Wearable computer 300 can be programmed to report the launch of a projectile responsive to recoil or sound, and in one embodiment alerts computer device 200 to the launch of a projectile responsive to simultaneous recoil and report signals. Using sound alone can lead to false launch detections due to nearby noises from e.g. other shooters, while using the accelerometer alone can lead to false launch detections when wearable computer 300 is bumped. Using both sound and acceleration can allow the acceleration and sound thresholds to be set relatively low to detect launches from relatively quiet, low-recoil weapons such as pellet guns.

Wearable computer 300 can be associated with shooter 400 so that the sensed launch can likewise be associated with shooter 400. Multimedia device 200 can thus monitor and score a shooting match between multiple shooters on the same or different targets, or can provide shooter-specific feedback and coaching. Wearable computer 300 may be programmed differently depending upon the user's wearing hand. In archery, for example, the acceleration that accompanies the loosing of an arrow is different for the hand holding the bow than for the hand drawing the bow. Hand-specific calibration may allow wearable computer 300 to better distinguish false launch signals. In other embodiments device 200 is mounted on the bow and directed toward the target, in which case device 200 can trigger image capture an analysis based on accelerometer input from both device 200 and wearable computer 300.

Figure 5:
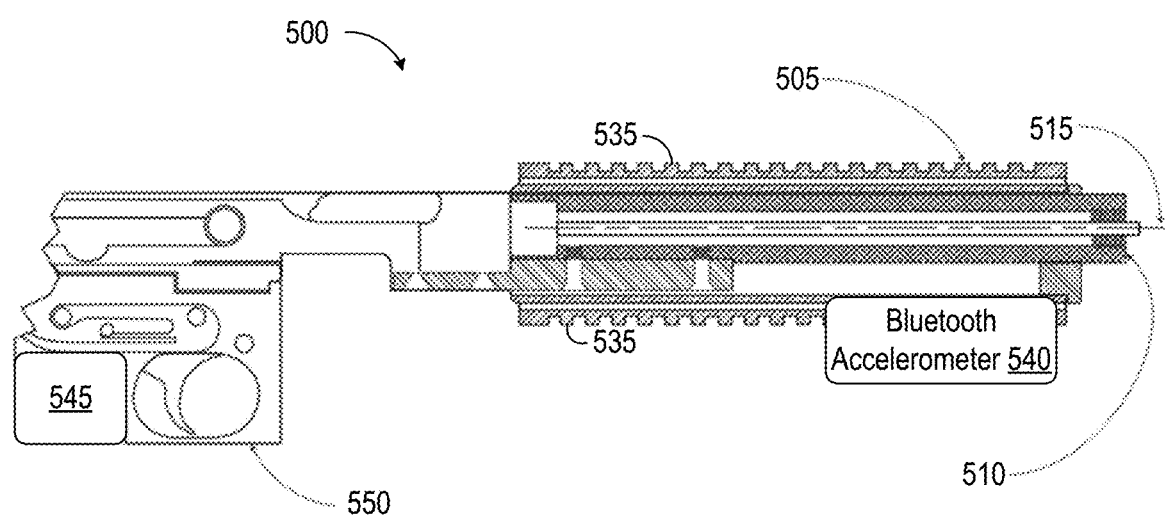
FIG. 5 depicts part of a conventional weapon 500, which includes a handguard 505 to encompass a barrel 510, the barrel defining a barrel axis 515.

FIG. 5 depicts part of a conventional weapon 500, which includes a handguard 505 to encompass a barrel 510, the barrel defining a barrel axis 515. Handguard 505 includes an outer surface supporting a number of accessory rails 535. A wireless sensing device 540 mounted to weapon 500 via e.g. one of accessory rails 535 includes e.g. a three-axis accelerometer to sense motion, vibration, and shock. Bluetooth® wireless support allows device 540 to send accelerometer data or decisions made based on this and/or other data to computer device 200.

Device 540 includes a unique identifier (ID) that allows computer device 200 to distinguish it from other devices. In one embodiment, device 540 includes a microphone, an accelerometer, and a processor that detects shots by correlating vibration-signals from the accelerometer with sound signals from the microphone. In another embodiment device 200 correlates reported recoil from device 540 with shot reports sensed by the microphone within device 200. An optical sensor can also be included to provide the internal or external processor signals indicative of muzzle flash. As used herein, the term "processor" is not limited to a single device, but is meant to cover any and all integrated circuits that process instructions and data to accomplish a desired result.

Computer device 200 can be programmed to associate device 540 with weapon 500, and thus to distinguish between devices, shooters, and weapons. A sensor 545 optically or mechanically connected to some mechanical aspect of the triggering mechanism in receiver 550 can similarly detect shots and convey reporting signals to computer device 200.

Device 200 can include an accelerometer to detect launches, either with or separate from sensed sound. For low-recoil weapons, such as pellet guns and bows, device 200 and associated optics can be mounted directly to the weapon with little concern for damage. Anti-vibration mounts designed to dampen the shock and frequency of recoil can be used to accommodate higher levels of recoil.

Where device 200 is decoupled from the weapon, such as mounted nearby on a shooting bench or tripod, vibrations from recoil and sound can propagate to device 200 through the air and solid support structures. A bench-mounted scope with attached accelerometer may, for example, sense bench vibrations caused by pressure waves or mechanical vibrations sourced from a weapon and interacting with the tabletop. Device 200 may therefore be able to distinguish between the shooter's weapon and weapons more isolated from the accelerometer. For example, device 200 may elect to capture an image responsive to a sound consistent with a projectile launch only if that sound is accompanied by vibrations of a given profile, such as having an amplitude above a threshold. Moreover, because vibrations travel through different media at different speeds, it may be that device 200 can distinguish between local and remote weapon reports by comparing the arrival time of sound and concomitant vibrations. In this case device 200 may be programmed to capture the sound and vibration signature of a given set up to accommodate differences in vibration transmission speed through various materials that may be mechanically coupled to device 200, materials that may include metal for a tripod and wood for a bench. Similar vibrations from an adjacent bench may be isolated from device 200 by the ground supporting both benches. Device 200 may be calibrated to distinguish between the signatures from the adjacent weapons.

Figure 6:
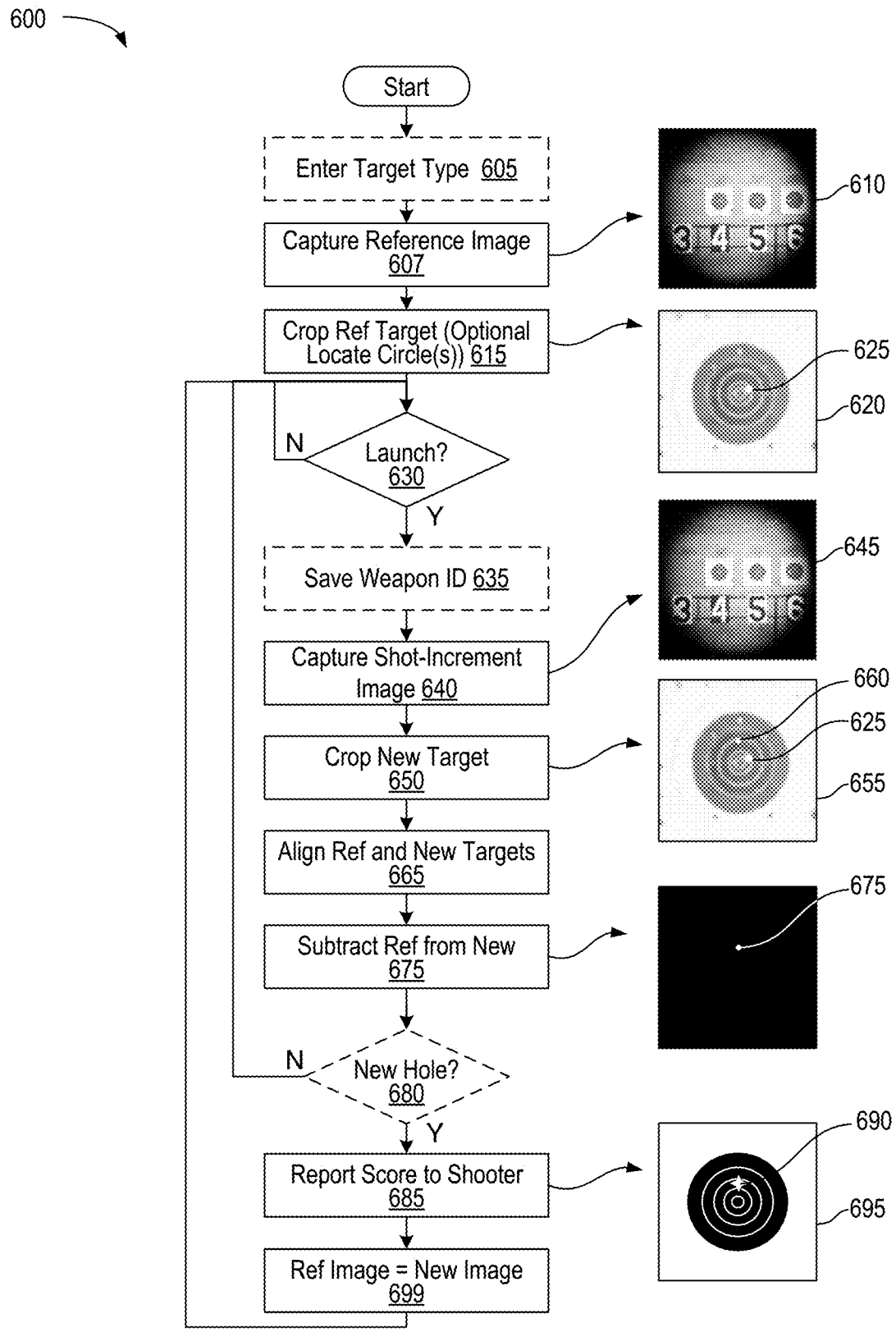
FIG. 6 is a flowchart 600 illustrating a manner in which computer device 200 can score a shooting match.

FIG. 6 is a flowchart 600 illustrating a manner in which computer device 200 can score a shooting match. To begin, the shooter starts a scoring application, or "app," on computing device 200. The shooter can enter the target type (605), many of which are of standardized dimensions. For example, a standard fifty-meter rifle target includes an outer circle of diameter Ø=154.4 mm, a four ring Ø=106.4 mm, a nine ring Ø=26.4 mm, and a 10 ring Ø=10.4 mm; and should be suspended 0.75 m above the ground or floor. Computer device 200 can use this information to simplify the process of identifying the target in sampled images. The shooter can also enter information characterizing the optical path of the scope and camera used by device 200 to sample images. Alternatively, device 200 can calculate the magnification provided by the spotting scope using the known camera characteristics, the standard and apparent sizes of target dimensions, and the distance to the target. If the user selects a fifty-meter target from a target library on the interface of device 200, for example, device 200 can assume a distance of fifty meters and calculate the magnification of the optical path using the apparent size of the outer circle in a sampled image of the target. These data can be associated with the spotting scope and stored as a calibration offset. A user might mark, for example, what setting on a 20-60× spotting scope provides 50× magnification, or may determine that such a scope offers a range somewhat different from what is specified, separate from or with the camera optics.

Device 200 can measure the distance to a target using the known magnification of the optical path, the size or sizes of the target or target features, and the apparent size of the imaged target. Distance calculations can help the shooter with target placement. The shooter can also enter ballistic data for the selected ammunition and weapon. Computer device 200 can calculate the area and shape of expected holes to reduce false positives. Device 200 can support barcode scanning to extract target and ballistic information from targets and ammunition containers suitably marked. For shooting sports that employ e.g. bolts or arrows, computer device 200 can filter out image artifacts based on expected properties of bolt or arrow images. Likewise, knowing the size and orientation of the target and target features simplifies target identification.

The shooter directs the optics to the target of interest and instructs device 200 to sample (607) a reference image 610 of the target area. The imaged area can be considerably larger than the target, and encompasses three targets in this illustration. Device 200 identifies each target within the image frame. Where the target type is known, device 200 searches for instances of the target in reference image 610 and crops out extraneous sample data (615) to obtain a simplified set of pre-launch image data represented here as a cropped image 620. If more than one target is found, device 200 prompts the shooter to select from among them. Alternatively, device 200 can be programmed to automatically select e.g. whichever target encompasses the center of the imaged frame, or to select the target after correlating a launch with a hole in a specific target using the procedure outlined below. Device 200 can track more than one target, but a single target is described here for ease of illustration.

In this example the pre-launch image data includes a hole 625 from a prior shot that will be disregarded from scoring in this illustration. One advantage of the scoring system illustrated here is that targets can be reused with little impact on scoring, and this advantage can save considerable time and money. As with visual scoring, targets that highlight shot holes and use unnatural colors, such as Splatterburst™ Targets, make it easier for the system to detect and locate targets and holes.

Shooting targets come in many forms and shapes. Most provide a rectangular background that provides contrast for one or more scoring areas. Each scoring area is typically divided into a number of smaller areas, such as concentric circles, that are afforded respective scores. Scoring areas are commonly dark and circular, but other shapes, colors, and combinations of colors are available. Device 200 can identify a target from the sampled image without prior knowledge of the target by comparing the cropped image 620 with a number of locally stored reference target types. Alternatively, such comparisons can be made remotely if device 200 has the requisite network access to a suitable target database. With no reference target available, device 200 can provide results to the shooter by superimposing markings on a sampled image of the actual target.

Once the pre-launch image data 620 is obtained, device 200 awaits input indicative of a launch. The shooter might provide the requisite input via the user interface. Alternatively, a microphone on device 200 may sense the report of a weapon to indicate a launch. Such embodiments do not discriminate between the shooter and adjacent shooters, however. Shooters can nevertheless be distinguished using the following process to search for a new hole. Where the shooter or weapon is equipped with a launch sensor, as noted above in connection with FIGS. 4 and 5, device 200 can positively correlate the launch with the presumed target.

When a launch is detected (630), device 200 can correlate the launch with the weapon (635) and shooter. Device 200 can thus distinguish shooters directing their projectiles to the same or different targets, and can sort historical training data by shooter and weapon. Responsive to the launch, device 200 captures a shot-increment image (640), in this instance a post-launch image 645. This image is cropped in the manner of step 615 (650) to obtain post-launch image data 655 that identifies both the pre-launch hole 625 and a post-launch hole 660.

The spotting scope can move between shots due to e.g. wind, human interaction, or the percussion of firing a weapon. Device 200 therefore aligns post-launch image data 655 with pre-launch image data 620 (665). Convolution can detect what shift is required to minimize any detected offset. Next, the aligned data 620 and 625 are compared to identify the difference (670), and thus the apparent point of impact 675 for the launch sensed in decision 630. Knowledge of the expected apparent hole size and shape can be used to disregard false positives.

Per optional decision 680, if no new hole is detected the process can return to decision 630. This allows device 200 to ignore data acquired responsive to detected launches from other shooters, but also ignores shots from the shooter of interest that wholly miss the target. Where system 200 is monitoring more than one target, the foregoing analysis can be provided for all targets and the shots reported accordingly.

Should decision 680 find a new hole consistent with the expected shape and diameter, device 200 reports the score of the shot to the shooter (685). This reporting can be done visually, via the wearable 300 or device 200, or can be announced. For sports and shooters that employ electronic noise-suppression, device 200 can communicate announcements via wired or wireless connections. In this example shot placement is depicted graphically using a flashing spot 690 on a graphical representation 695 of the target to identify the most-recent hole. Scoring and other data can be shared locally (e.g. to a head's up display, laptop, or tablet) or remotely via network resources supported by device 200.

Holes from prior launches can be highlighted differently, marked for order, etc. Holes from prior sets, different shooters, or different weapons can be marked or obscured to distinguish between them, indicate their order, etc. Scoring may also be relayed to the shooter as coordinates. Representation 695 can be a cropped image of the target overlaid with scoring information, or can be a graphical representation of the target created from the image or taken from a library of target types. Graphically representing the target can improve legibility and allow the shooter to easily disregard prior holes and highlight or include marks of interest, such as enumerations of the various scoring rings. Moreover, representation 695 need not appear as the actual target. A shooter might, for example, see how her shot or shot pattern appears on any number of targets and target types. In this way a shooter could receive a score for a competition target while aiming at e.g. a different type of competition target or even a mark on a sheet of cardboard or paper. Device 200 may also depict the target and marked points of impact as they would appear at a different distance. If the shooter is using a fifty-meter target at fifty yards, for example, device 200 could extrapolate from the point of impact using the ballistics of each shot to calculate an expected point of impact at fifty meters. The resultant data can then be reported to the shooter as though the target was at the correct distance. This ability allows shooters to practice on standard targets in venues that may not support the standard distance. Device 200 can measure the target distance as detailed previously, the distance can be assumed based on the selected target, or the distance can be entered manually by the shooter. Range information can also be provided by a rangefinder with a wired or wireless connection to device 200. Device 200 can use knowledge of the weapon and any associated optics to provide the shooter or the sighting system with sighting corrections.

Device 200 replaces reference data 620 with new data 655 (699) and returns to decision 630 to await the next launch. The shooter can halt scoring at any time by interacting with the user interface. Device 200 can also organize a shooting session with a specified number of launches and maintain the score throughout the session or match.

Using a sensed launch to trigger image capture saves power. In other embodiments image frames are captured periodically and reviewed for new holes. Such embodiments provide multiple between-launch frames that can be combined to reduce the impact of noise. Likewise, multiple images captured post-launch could be combined to the same end. Device 200 can select the number and duration of exposures, for example, based on the available light level and required resolution. Increased exposure times, particularly at high levels of magnification, can blur holes. Aligning successive, shorter exposures improves low-light performance at the cost of additional image processing.

Device 200 can be programmed to delay image capture or score reporting until after more than one shot, such as to await the end of a competition or session. Device 200 might await ten launches before capturing image data, or may capture ten successive images responsive to sensed launches but await reporting until the final launch. In the latter case the rounds can be labeled in time order.

Sensing projectile launch limits the number of post-launch images and related processing. In some embodiments, however, computer device 200 is programmed to detect post-launch images by oversampling images. In one embodiment, for example, computer device 200 begins scoring responsive to a shooter input as noted above. Rather than await a signal indicative of a projectile launch, however, device 200 periodically captures, crops, aligns, and compares images to detect new points of impact, and thus a recent launch. Capturing a new image every two seconds, for example, allows device 200 to distinguish between shots separated in time by at least two seconds. This process can be a shooter-selectable operational mode used when launch detection is difficult.

Figure 7:
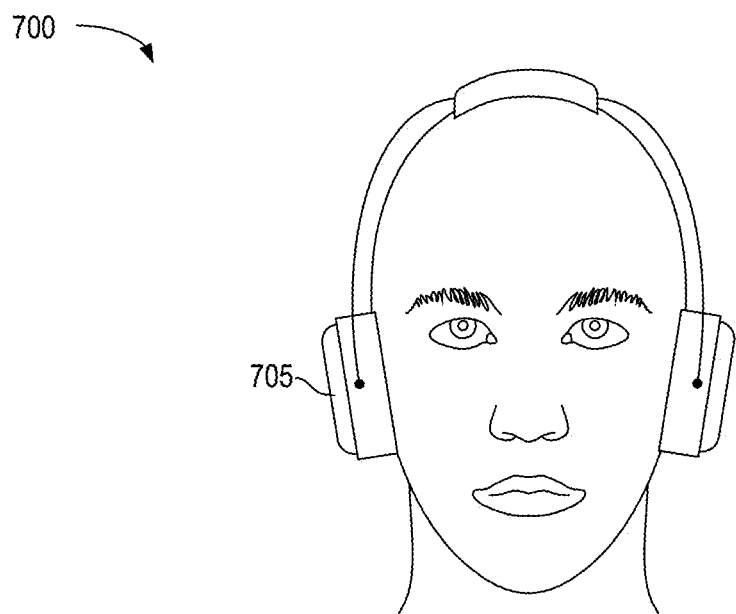
FIG. 7 depicts a shooter 700 with Bluetooth® enabled noise-suppressing headphones 705 that can be coupled to device 200 to receive shooting feedback via either a wired or wireless connection.

FIG. 7 depicts a shooter 700 with Bluetooth® enabled noise-suppressing headphones 705 that can be coupled to device 200 to receive shooting feedback via either a wired or wireless connection.

Figure 8:
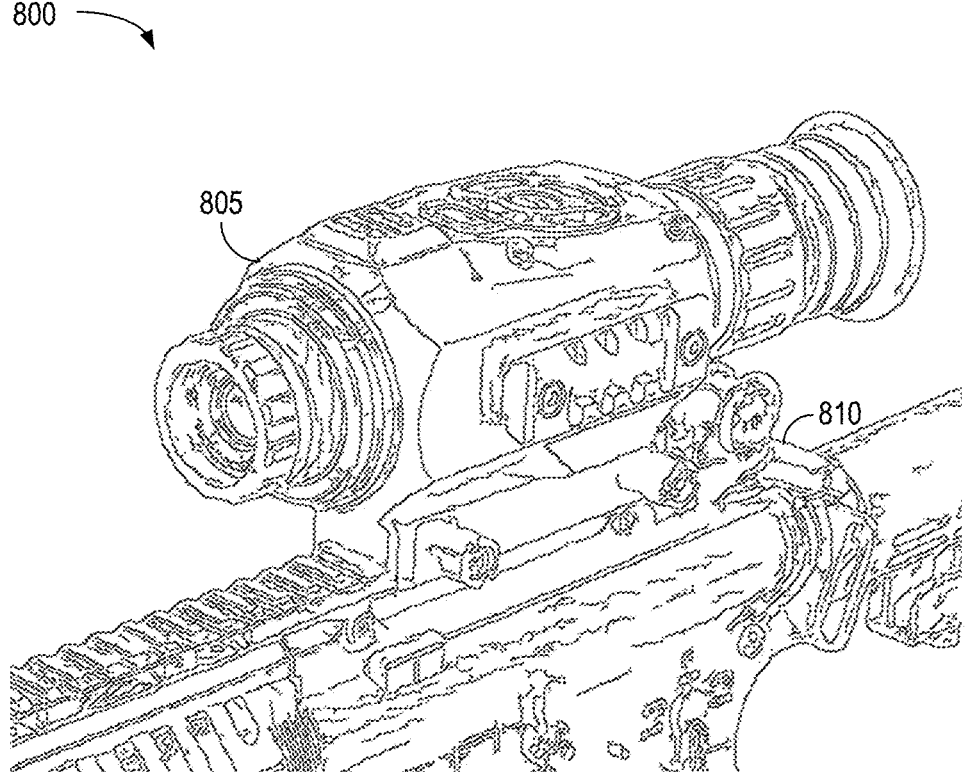
FIG. 8 depicts a shooting system 800 in which a riflescope 805 is mounted to a rifle 810.

FIG. 8 depicts a shooting system 800 in which a riflescope 805 is mounted to a rifle 810. Riflescope 805 includes an integrated accelerometer and video camera that can be used to capture images responsive to the recoil indicative of launched projectiles. Riflescope also includes a rangefinder. Riflescopes so equipped are available from as the Thor-HD Series from ATN Corp. In one embodiment a riflescope is modified to perform some or all of the steps detailed in connection with FIG. 6. Some or all of the image processing can be offloaded or shared with e.g. device 200. The rangefinder and a library of known targets can be used with the magnification provided by the riflescope to identify the type of target in a captured image.

Figure 9:
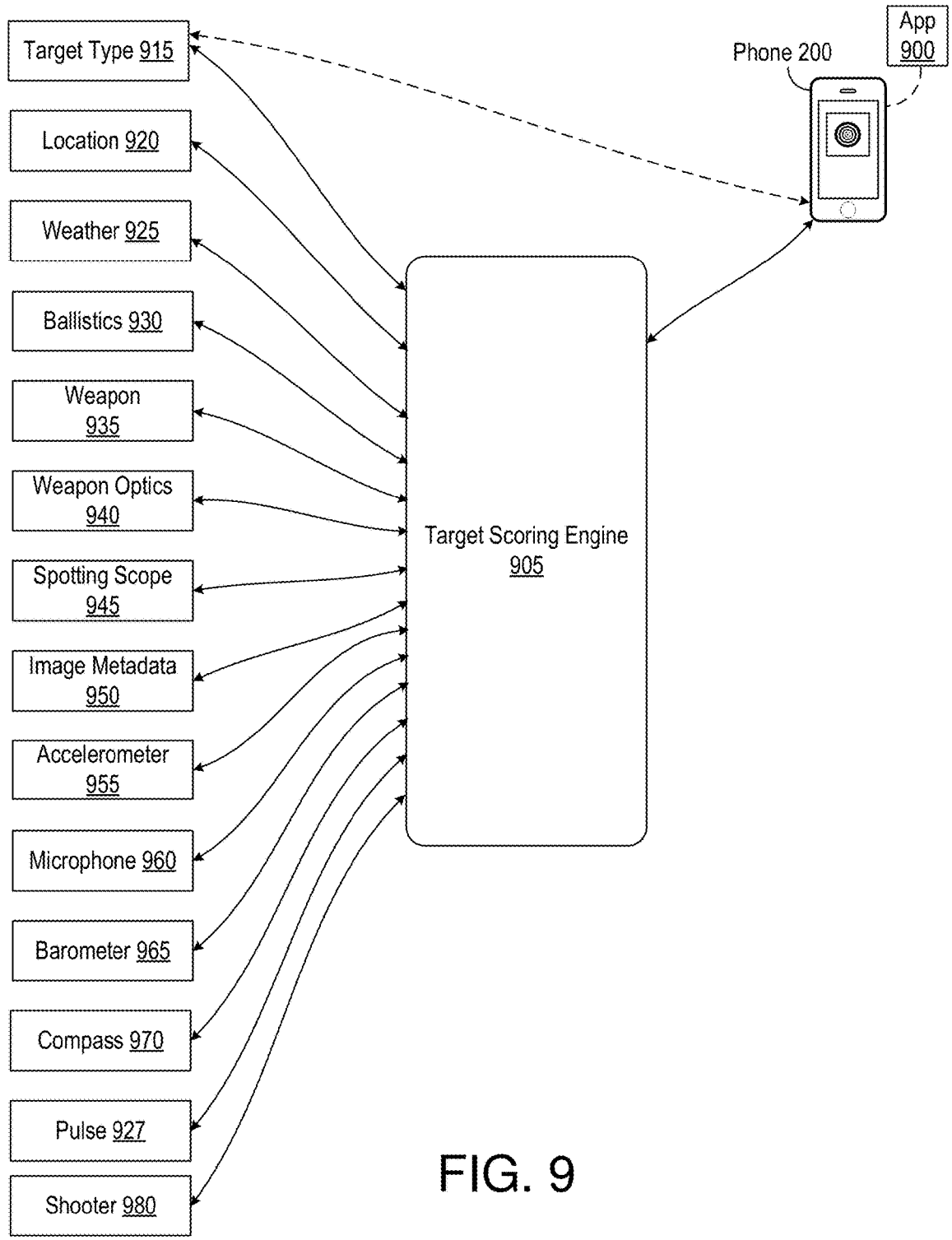
FIG. 9 depicts device 200 of FIG. 2 executing an application 900 for scoring, analyzing, and recording data relating to shooting sports.

FIG. 9 depicts device 200 of FIG. 2 executing an application 900 for scoring, analyzing, and recording data relating to shooting sports. Software executed in device 200 is represented as an app 900 that, with the processing hardware in device 200, provides a target scoring engine 905 with access to a set of data sources 910 that can be useful in analyzing, reporting, and scoring shooting performance.

Data sources 910 can reside in device 200 and can be supplemented from remote information resources. This non-exhaustive list includes the following types and sources of data that can be used to characterize or supplement shooting sports. Target type 915 can be entered by the user directly, can be selected from a list, or can be automatically recognized using image processing. Absent a library of targets, device 200 could e.g. search and highlight rectangles or circles and allow the shooter to select between them. Detailed target parameters can be stored locally or elsewhere. Location data 920 can be entered manually, as by street address, or can be gathered using e.g. cell-tower triangulation or position or an integrated GPS receiver. Location and time can be used to request access to weather data 925 and elevation data, both of which can impact shooting performance. Ballistics 930 for the projectile of interest and weapon parameters 935 can be entered or looked up from a list stored locally or remotely. Device 200 can perform ballistics calculations to determining projectile drop, wind drift, impact energy, and flight time in a manner tailored to a specific weapon, projectile, and environmental conditions.

Weapon optics data 940, such as the specification for a rifle scope, allows device 200 to tailor elevation and windage adjustments. Spotting scope data 945 allow device 200 to calculate the relative size of imaged objects, such as targets, target features, and holes. This data reduces the processing required to identify and locate imaged objects. Device 200 captures and stores image metadata 950 with each image. This metadata can include aperture and shutter speed, which can be used as a proxy for image clarity and scene brightness. These data can be used to optimize image capture for place-of-impact identification. Accelerometer data 955 and microphone data 960, either of both of which can be sources on device 200 or elsewhere, are used as detailed above to e.g. detect projectile launches and trigger image acquisition. Barometer 965 measures atmospheric pressure, a factor that affects projectile flight. Device 200 can calculate the effects of atmospheric pressure on projectile trajectory and store measures of atmospheric pressure with shooting-session data.

Compass data 970, possibly from an integrated compass, can be used to indicate the shooting direction. Direction is of interest to shooters because the Coriolis force affects the point of impact as a function of a projectile's direction of travel. The resulting offsets are likely inconsequential for practical shooters but might be observable over large sets of shooting data. Shooting direction can also be considered with location, weather, and date to provide useful information about outdoor lighting, which can affect shooter performance. Pulse data 927, conveyed from a remote sensor of the type available in some wearable devices, can be timed to launch events to provide instructional feedback. In some embodiments the shooters heart beats can be played to the shooter visibly, audibly, or haptically to allow the shooter to time launch, and heartbeat data can be displayed in correlation with shot timing and placement. Accelerometer data indicative of weapon movement can likewise be displayed in correlation with shot timing and placement to identify user behavior leading to poor precision or accuracy. Shooter data 980 can personalize the shooting experience for one or more shooters.

Device 200 can maintain a record of all the data provided by sources 910 correlated to shooter activity. The resultant rich set of information can be used for extensive statistical analysis of interest and use to the shooter. Device 200 can look for patterns and changes that reflect issues of form and suggest appropriate corrections. Corrections and equipment calibrations and modifications can be fed back into the database so that future shooting sessions can measure and report the impact of those changes. Weapon vibration can be analyzed to detect recoil anticipation or post-launch flinching, both of which can adversely impact shot placement. Shooters can be coached to offset such sensed flaws in shooting technique.

Figure 10:
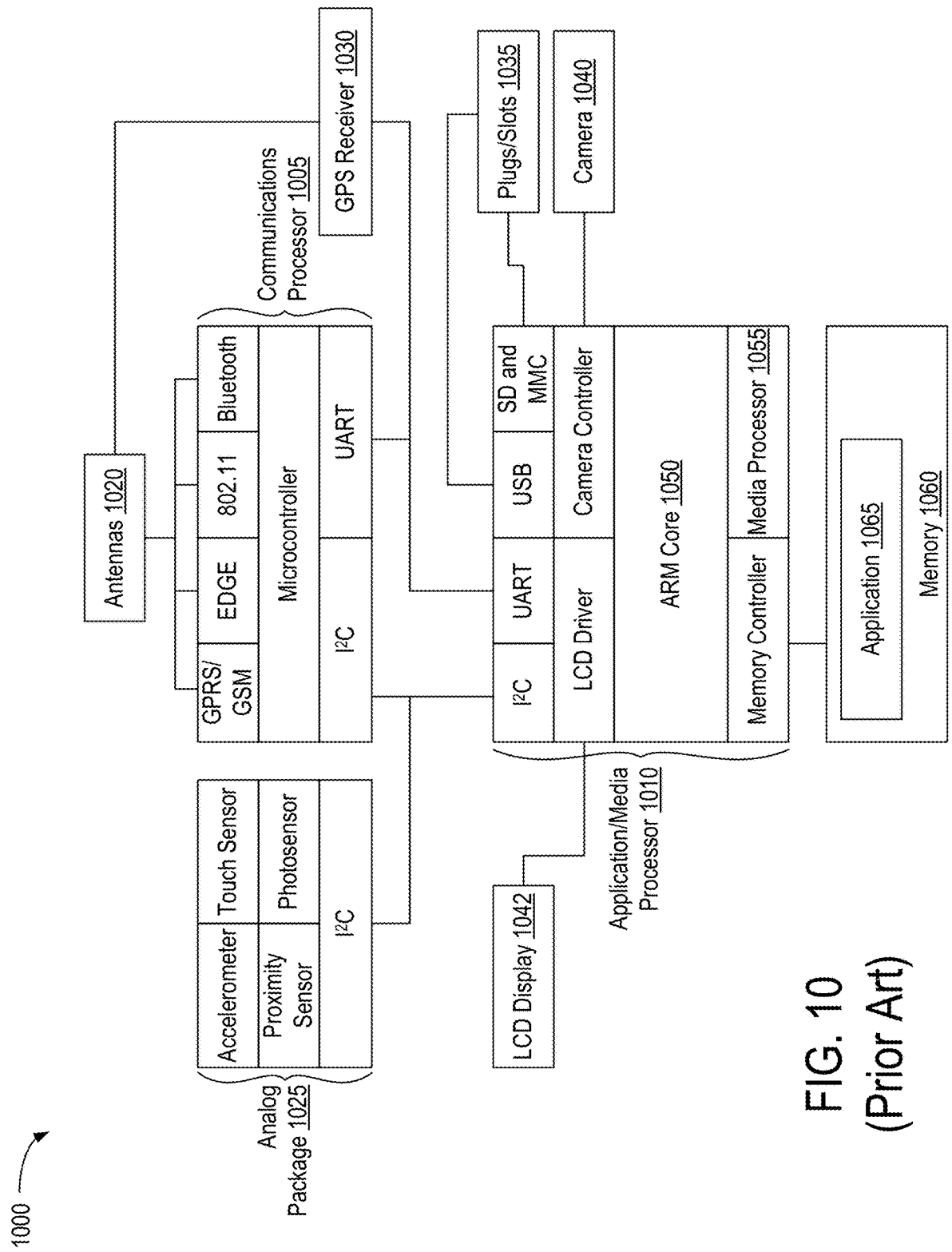
FIG. 10 (Prior art) is a block diagram of a conventional iPhone® (phone 1000), an Internet-connected multimedia smart phone available from Apple, Inc., of Cupertino, Calif.

FIG. 10 is a block diagram of a conventional iPhone® (phone 1000), an Internet-connected multimedia smart phone available from Apple, Inc., of Cupertino, Calif. Phone 1000 may be adapted to select data, render views of data, and to change views of data, in response to shooter input with little or no hardware modifications. In one embodiment, for example, an iPhone® can be configured to display one or more marked targets and related data gathered and employed as detailed previously. Phone 1000 and its constituent components are well understood by those of skill in the art. A brief description of the phone systems and subsystems is provided for context.

Phone 1000 includes a number of processors, including a communications processor 1005 and an application/media processor 1010 that are interconnected by a pair of serial interfaces I²C (for Inter-Integrated Circuit) and UART (for Universal Asynchronous Receiver/Transmitter). For this disclosure all processors in phone 1000 are treated as a single processor that performs some stated function. A media processor 1055 and ARM core 1050 can be integrated or separated integrated circuits that work together to process images and detect post-launch holes.

Communications processor 1005, sometimes called a baseband processor, supports widely used wireless communication protocols, GPRS/GSM, EDGE, 802.11, and Bluetooth™, and is coupled to a respective set of antennas 1020 for this purpose. The GPRS/GSM block, part of the cellular front end, can be adapted to support different cellular communication standards in other embodiments. Phones in accordance with still other embodiments communicate via networks other than cellular networks, in which case the function of the cellular front end is provided by a different form of wireless network interface.

Application/media processor 1010 is at the heart of the phone, and includes support for a number of input/output devices in addition to what is provided by the communications processor. An analog package 1025 includes orientation sensors, e.g., an accelerometer, a touch sensor, a proximity sensor, and a photo-sensor. The accelerometer allows the application processor to sense changes in phone orientation, the touch sensor supports the user interface, the proximity sensor senses, e.g., that the phone is near or far from the user's cheek or the difference between a cheek and a fingertip, and the photo-sensor provides a measure of ambient light for, e.g., adjusting display backlighting. Other useful input comes from a GPS receiver 1030, plugs/slots 1035 that support memory cards and a USB port, and a camera 1040. Other sensors, such as a microphone, are not shown. User output is provided by an LCD display 1042 and, though not shown, a speaker, headphone jack, and a motor supporting a vibrating alert.

Application/media processor 1010 includes two sub-processors, a general purpose ARM (Advanced RISC Machine) core 1050 and a media processor 1055 dedicated to the efficient processing of audio and video data. A memory device or module (multiple memory die) 1060 stores instructions and data for processor 1010. Memory 1060 is implemented using, e.g., synchronous dynamic random access memory (SDRAM). Phone 1000 is programmed, in accordance with one embodiment, to execute an application supporting the functionality detailed herein.

FIG. 11 depicts data fields of a webpage 1100 that a shooter maintains in accordance with one embodiment. Webpage 1100 is an interface to a cloud-based data store (not shown) that automatically updates a shooter database with data from e.g. sources 910 of FIG. 9. These data can be combined with other public and private data, such as manufacturers' ballistic data and performance and personal data from other shooters. Webpage 1100 allows shooters to record equipment and event data, receive feedback based on performance, and share data and events with other shooters.

An insights window 1105 offers coaching feedback specific to equipment and ammunition used by the shooter for one or more events.

A personal-records window 1110 tracks the shooter's performance in correlation with the equipment and other variables that contributed to those records.

A leaderboard window 1115 compares shooter performance with a friend or friends. Those not shown, window 1115 can allow the shooter to sort the competitive field using various parameters, such as an overall score, a weapon/weapon-type-specific or range-specific score, etc. Here and elsewhere the shooter can access layers of data that identify optimal combinations of variables, such as to identify what weapon, ammunition, and weather are most suitable for his or her performance. Because the database underlying webpage 1100 has access to data from multiple shooters, the cloud-based system can extract the effects of equipment, range, etc., on event scoring. In a virtual match, for example, two shooters can compete at different locations using different targets and weapons. Large ballistic databases could isolate shooter performance from the impact of e.g. range and weapon choice to facilitate the handicapping of shooters and concomitant fair contests. Shooters with less expensive weapons could compete fairly against better-equipped adversaries.

Windows 1120 and 1125 allow the shooter to enter or view lists of equipment and ammunition. Third-party data, such as manufacturer ballistics for a weapon or ammunition, can be compared with shooter data from e.g. device 200 of FIG. 2. These data, particularly if gathered from many shooters using a diverse array of weapons and ammunition, will be of value to other shooters and manufacturers. For example, insights window 1105 can report that ammunition of a certain type or from a particular source performs well with equipment of the type selected by the user. Equipment and ammunition vendors can pay the entity managing the sharing resource (e.g., the cloud-computing environment) to have their wares recommended, or to gain access to a body of performance data characterizing their or their competitors' products.

A window 1130 reports shooting sessions to the shooter. Device 200 can include a GPS, and can thus report event locations. These locations can be correlated with the locations of shooting ranges and data descriptive of those ranges. Where an ambiguity exists, such as whether the shooter was shooting at 50 yards or 100, page 1100 can prompt the shooter to resolve the issue. Window 1130 can have hyperlinks to event-specific data at any level of granularity on offer from the available data.

A window 1135 lists rewards, or "badges," that the shooter collects through the sharing of data.

A window 1140 allows the user to access targets. Paper targets can be printed if the shooter has access to a printer that accommodates the job. Alternatively, the shooter can access an online store to purchase targets.

In the foregoing description and in the accompanying drawings, specific terminology and drawing symbols are set forth to provide a thorough understanding of the present invention. In some instances, the terminology and symbols may imply specific details that are not required to practice the invention. For example, the phones discussed above are "smart phones" that support many services in addition to standard voice functions. Portable computing devices other than smart phones, such as tablet computers, e.g., an iPad® manufactured by Apple, Inc. of Cupertino, Calif., and palm-top and lap-top computers, can be equipped as detailed herein. Moreover, machine-learning algorithms and systems with access to training data and sensors of the type detailed herein can be used to detect and signal points of impact. While the present invention has been described in connection with specific embodiments, variations of these embodiments will be obvious to those of ordinary skill in the art. Moreover, some components are shown directly connected to one another while others are shown connected via intermediate components, or wirelessly, e.g., Wi-Fi or Bluetooth®. In each instance, the method of interconnection establishes some desired electrical communication between two or more devices, as will be understood by those of skill in the art. Therefore, the spirit and scope of the appended claims should not be limited to the foregoing description. In U.S. applications, only those claims specifically reciting "means for" or "step for" should be construed in the manner required under 35 U.S.C. § 112(f).

What is claimed is:

1. A system for scoring shooting sports in which a shooter launches a projectile at a target, the system comprising:
   an image detector to sample images of the target, the images including pre-launch image data sampled before the projectile is launched at the target and post-launch image data sampled after the projectile is launched at the target;
   at least one processor coupled to the image detector, the at least one processor to compare the pre-launch image data and the post-launch image data to locate a point of impact of the projectile on the target;
   a user interface coupled to the at least one processor to indicate the point of impact to the shooter; and
   a pulse meter attached to the wrist band to measure a pulse of the shooter, the at least one processor to correlate the pulse with the post-launch image data.

2. The system of claim 1, the at least one processor to align the pre-launch image data with the post-launch image data before the comparing.

3. The system of claim 2, the at least one processor to identify the target in at least one of the pre-launch image data and the post-launch image data.

4. The system of claim 3, the at least one processor to disregard pre-launch image data outside the identified target and post-launch image data outside the identified target for the comparing.

5. The system of claim 3, the at least one processor to calculate a distance from the image detector to the target from the identified target.

6. The system of claim 3, the at least one processor to identify a bullseye within the identified target.

7. The system of claim 1, further comprising memory to store characteristics of the target, the at least one processor to calculate a score from the point of impact and the characteristics of the target.

8. The system of claim 1, further comprising an accelerometer to detect the launch.

9. The system of claim 8, further comprising a weapon to launch the projectile and a physical connection between the weapon and the accelerometer.

10. The system of claim 9, further comprising a wrist band to attach the accelerometer to the shooter.

11. The system of claim 1, further comprising a second accelerometer to detect a second launch and correlate the first-mentioned accelerometer to the first-mentioned launch and the second accelerometer to the second launch.

12. The system of claim 11, the images including second post-launch image data sampled after the second launch, the at least one processor to locate a second point of impact of the second launch.

13. The system of claim 12, further comprising memory to store a first shooter ID associated with the first-mentioned shooter and first-mentioned accelerometer and a second shooter ID associated with a second shooter and the second accelerometer, the user interface to identify the first-mentioned point of impact with the first-mentioned shooter and the second point of impact to the second shooter.

14. A method for scoring shooting sports in which a shooter launches a projectile at a target from a weapon, the method comprising:
   imaging the target to capture pre-launch image data;
   sensing a pulse of the shooter to capture pulse data;
   sensing a first acceleration of the weapon;
   responsive to the first acceleration, imaging the target to capture first post-launch image data and launch timing;
   comparing the pre-launch image data with the first post-launch image data to identify a first point-of-impact on the target;
   reporting the first point-of-impact to the shooter; and
   displaying the pulse data in correlation with the launch timing.

15. The method of claim 14, further comprising:
   sensing a second acceleration and, responsive to the second acceleration, imaging the target to capture second post-launch image data;
   comparing the second post-launch image data with at least a subset of the first post-launch image data and the pre-launch image data to identify a second point-of-impact on the target; and
   reporting the second point-of-impact.

16. The method of claim 15, further comprising associating the second acceleration with a second shooter.

17. The method of claim 14, wherein sensing the first acceleration comprising receiving a signal from a wearable computer of the shooter.

18. The method of claim 14, wherein sensing the first acceleration comprising receiving a signal from an accelerometer mounted to the weapon.

19. The method of claim 14, further comprising sensing a noise associated with the launching of the projectile and imaging the target to capture the first post-launch image data responsive to the first acceleration and the noise.

* * * * *